United States Patent
Chou et al.

(10) Patent No.: US 8,837,341 B2
(45) Date of Patent: Sep. 16, 2014

(54) OPERATING METHOD OF LOW-POWER-CONSUMPTION WIRELESS SENSOR NETWORK SYSTEM

(75) Inventors: Pai-Hsiang Chou, Taipei (TW);
 An-Ping Wang, Hsinchu (TW);
 Chi-Yuan Lee, Kaohsiung (TW);
 Shin-Yi Chang, Chiayi County (TW);
 Cheng-Dao Lee, Taoyuan County (TW)

(73) Assignee: National Tsing Hua University, Hsinchu (TW)

( * ) Notice: Subject to any disclaimer, the term of this patent is extended or adjusted under 35 U.S.C. 154(b) by 112 days.

(21) Appl. No.: 13/530,695

(22) Filed: Jun. 22, 2012

(65) Prior Publication Data
US 2013/0223310 A1 Aug. 29, 2013

(30) Foreign Application Priority Data
Feb. 29, 2012 (TW) .............................. 101106462 A

(51) Int. Cl.
 *G08C 17/00* (2006.01)
(52) U.S. Cl.
 USPC .......................................... 370/311; 370/338

(58) Field of Classification Search
None
See application file for complete search history.

(56) References Cited

U.S. PATENT DOCUMENTS

| | | | |
|---|---|---|---|
| 6,161,186 A | 12/2000 | Smith | |
| 7,522,639 B1 * | 4/2009 | Katz | 370/503 |
| 2005/0084037 A1 | 4/2005 | Liang | |
| 2009/0225731 A1 * | 9/2009 | Kneckt et al. | 370/338 |
| 2009/0268652 A1 * | 10/2009 | Kneckt et al. | 370/311 |
| 2011/0122780 A1 * | 5/2011 | Nieminen et al. | 370/252 |
| 2012/0122575 A1 * | 5/2012 | Barney et al. | 463/31 |
| 2013/0063027 A1 * | 3/2013 | Recker et al. | 315/86 |
| 2013/0338839 A1 * | 12/2013 | Rogers et al. | 700/278 |

* cited by examiner

*Primary Examiner* — Anh-Vu Ly
(74) *Attorney, Agent, or Firm* — Muncy, Geissler, Olds & Lowe, P.C.

(57) ABSTRACT

The invention provides an operating method of low-power-consumption wireless sensor network system, which comprises a plurality of nodes. Wherein, the nodes can be enforced to enter a sleep state at a preset times and enter an awake state by a first light.

8 Claims, 4 Drawing Sheets

OPERATING METHOD OF LOW-POWER-CONSUMPTION WIRELESS SENSOR NETWORK SYSTEM

This application claims priority of No. 101106462 filed in Taiwan R.O.C. on Feb. 29, 2012 under 35 USC 119, the entire content of which is hereby incorporated by reference.

BACKGROUND OF THE INVENTION

1. Field of the Invention

The invention relates to a wireless sensor network (WSN) system, and more particularly to a WSN system awakened by utilizing a light.

2. Related Art

The wake-up mechanism in present wireless sensor network systems is mainly dependent on a singular wake-up mechanism. When a node of the wireless sensor network system enters a sleeping state, the receiving device of the node must be in an awake state in order for the node to be awakened through radio-frequency signal.

However, the wake-up mechanism triggered through radio frequency signal is power-consumptive. The wireless sensor network system deployed at a location without power outlets are usually powered by batteries. High power consumption at the wireless sensor network system may easily result in battery depletion. When the wireless sensor network system has no remaining battery capacity, the wireless sensor network system becomes disconnected and end devices become unable to communicate to the coordinator.

SUMMARY OF THE INVENTION

One object of the invention is to provide a wireless sensor network system to decrease power consumption.

One object of the invention is to provide a wireless sensor network system with a wake-up triggering mechanism without using radio-frequency signal or timer.

One object of the invention is to prolong the lifetime of a battery-powered wireless network system.

One embodiment of the invention provides a low-power-consumption wireless sensor network system, comprising a plurality of nodes; wherein, the nodes can be enforced to enter a sleep state at a preset times and enter an awake state by a first light.

One embodiment of the invention provides an operating method of low-power-consumption wireless sensor network system, the method comprising the following steps: establishing a plurality of nodes; wherein, the nodes can be enforced to enter a sleep state at a preset time and enter an awake state by a first light.

DETAILED DESCRIPTION OF THE INVENTION

Figure 1:
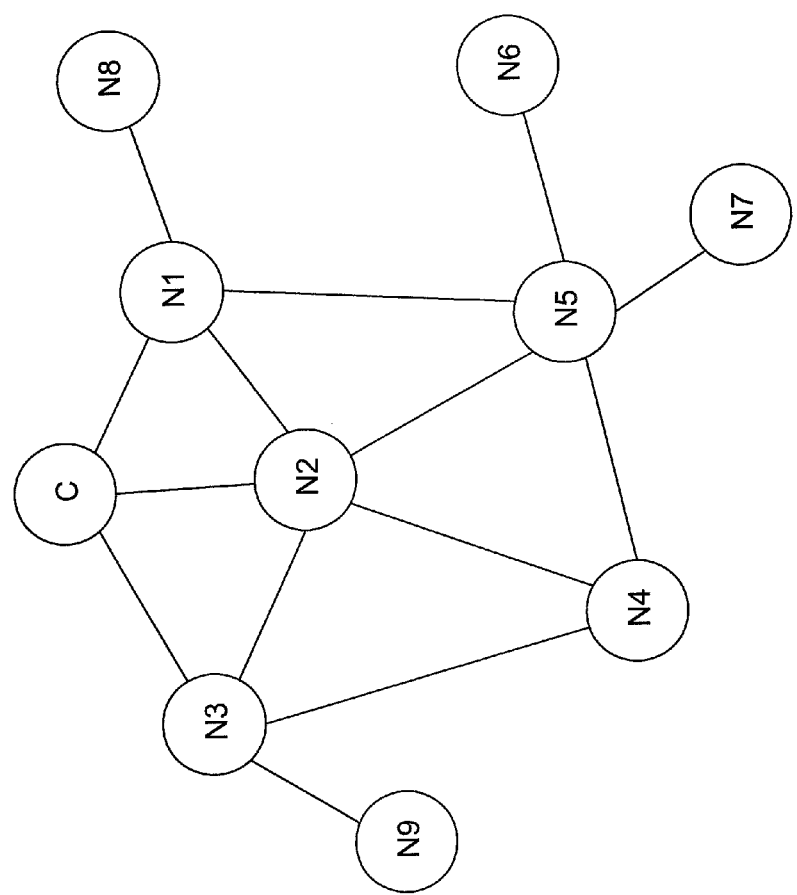
FIG. 1 shows a schematic diagram illustrating a node distribution of a wireless sensor network system according to one embodiment of the invention.

Please refer to FIG. 1. FIG. 1 shows a schematic diagram illustrating a node distribution of a wireless sensor network system according to one embodiment of the invention. The wireless sensor network system 100 includes nine nodes N1~N9 and a coordinator C. In this embodiment, the number of nodes of the wireless sensor network system 100 is not limited to this number, that is, 9. The coordinator C is responsible to establish a wireless network.

For example, for the node N1, the nodes N5 and N8 are the corresponding children nodes. In other words, the node N1 is the parent node of the nodes N5 and N8. For the node N5, the nodes N6 and N7 are the corresponding children nodes. In other words, the node N5 is the parent node of the nodes N6 and N7. For the node N4, the nodes N2, N3 and N5 are candidates for the corresponding parent node.

It can be seen that wireless sensor network system 100 comprises a plurality of children nodes and a plurality of parent nodes. For each node, it can be a child node of the other node(s) or a parent node of the other node(s), depending on the configuration of the whole wireless sensor network system but the invention is not limited to this example. In other words, a network path-sharing device also can either be a child node or a parent node.

Figure 2:
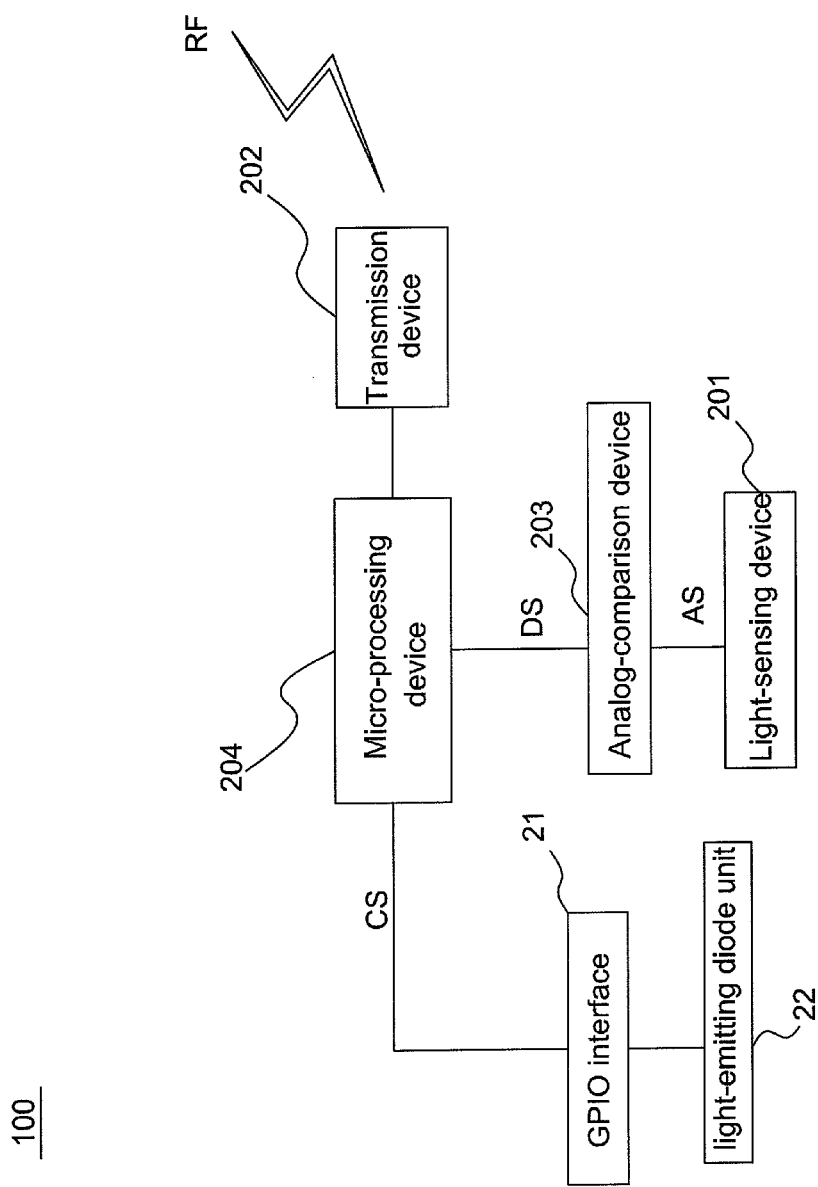
FIG. 2 shows a schematic diagram illustrating a wireless sensor network system according to one embodiment of the invention.

Please also refer to FIG. 2. FIG. 2 shows a schematic diagram illustrating a wireless sensor network system according to one embodiment of the invention. Each parent node and child node (nodes N1~N9) comprise a light-sensing device 201, a transmission device 202, an analog-comparison device 203, and a micro-processing device 204.

Wherein, light-sensing device 201 is used to sense a luminance of an environment light and generate an analog signal AS according to the luminance. Transmission device 202 couples to the light-sensing device 201 and performs data transmission with the neighbor parent nodes or children nodes through a radio frequency signal RF. Light-sensing device 201 transmits the analog signal AS to analog comparison device 203, and analog-comparison device 203 compares the analog signal AS with a predetermined threshold value to determine whether to wake the micro-processing device 204 up by outputting a digital signal DS.

It is to be noted that, after the wireless sensing system 100 have been initialized, analog-comparison device 203 presets the threshold value. Micro-processing device 204 and Transmission device 202 are in a sleep state, and analog-comparison device 203 is in an awake state.

If the luminance of the environment light exceeds the threshold value, it means that when analog-comparison device 203 determining the luminance is greater than the threshold value according to analog signal AS, analog-comparison device 203 converts analog signal AS to digital signal DS and transmits digital signal DS to micro-processing device 204, micro-processing device 204 is woken up to control transmission device 202, thus micro-processing device 204 and transmission device 202 can perform the corresponding operation.

In one embodiment, micro-processing device 204 calculates the luminance of the light and transmits the calculation result to corresponding parent node or child node by transmission device 202, and nodes N1~N9 transmit the sensing data to coordinator C.

In present embodiment, the light source can also be satisfied by laser light, infrared ray, or other sources of light with a different energy level or wavelength to determine whether to wake up nodes N1~N9 according to the user operation.

However, wireless sensor network system 100 of the invention is through following control function to determine whether each node enters the awake state from the sleep state according to the environment light corresponding to the node. Therefore, transmission device 202 on each node does not always remain in an awake state. Without waking up through the radio-frequency signal RF, each node can decrease its power consumption.

Then, please refer to the controlling function:

```
/* RF initialization */
epl_rf_en_quick_init(cfg);
    /* Light sensor initialization */
    epl_light_init( );
    /* Analog Comparator init, an wakeup source
    will raise if analog input is greater than
    the preset threshold */
    epl_Ana_Cmp_Wakeup_init( );
    while(1){
    /* Sleep and wait for wakeup */
    epl_sleep_and_wakeup(OP520);
}
```

In the embodiment, initially, each node initializes transmission device 202 and light-sensing device 201 according to functions epl_rf_en_quick_init(cfg) and epl_light_init( ). Then, transmission device 202 and light-sensing device 201 enter the sleep state, and each node sets an initial parameter and the threshold value of analog-comparison device 203.

Function epl_sleep_and_wakeup(OP520) sets micro-processing device 204 of each node and makes it enter the sleep state, and the luminance sensing by light-sensing device 201 (OP520 is a model number of light sensing device 201 in one embodiment) on each node will determine whether to wake up the micro-processing device 204. When the luminance is greater the threshold value, light-sensing device 201 enforces aforementioned wake-up action through analog-comparison device 203 by utilizing function epl_sleep_and_wakeup (OP520). In one embodiment, after analog-comparison device 203 wakes up micro-processing device 204 and transmission device 202, micro-processing device 204 will calculate sensing data collected from light-sensing device 201 and transmit data through transmission device 202.

Therefore, in wireless sensor network system 100 of the invention, each node can be determined to enter the awake state or not through aforementioned functions. In other words, light-sensing device 201 can determine whether the luminance of the light is greater than the threshold value or not to make the corresponding node entering the awake state.

It should be noted that, after a child node or parent node enters the awake state, micro-processing device 204 generates a control signal transmitted to a light-emitting diode unit through a GPIO interface 21 to make light-emitting diode unit 22 generating a light pulse. As the result, the neighbor nodes can be enforced to enter the awake state by the light pulse that is generated by light-emitting diode unit 22. In one embodiment, the light pulse generated by light emitting diode unit 22 can be satisfied by infrared ray or visible light.

Therefore, after nodes N1~N9 enter the awake state from the sleep state, nodes N1~N9 will generate the light pulse to wake up the neighbor nodes. The principle of all other operations is the same as the above description and will not be given hereinafter.

Figure 3:
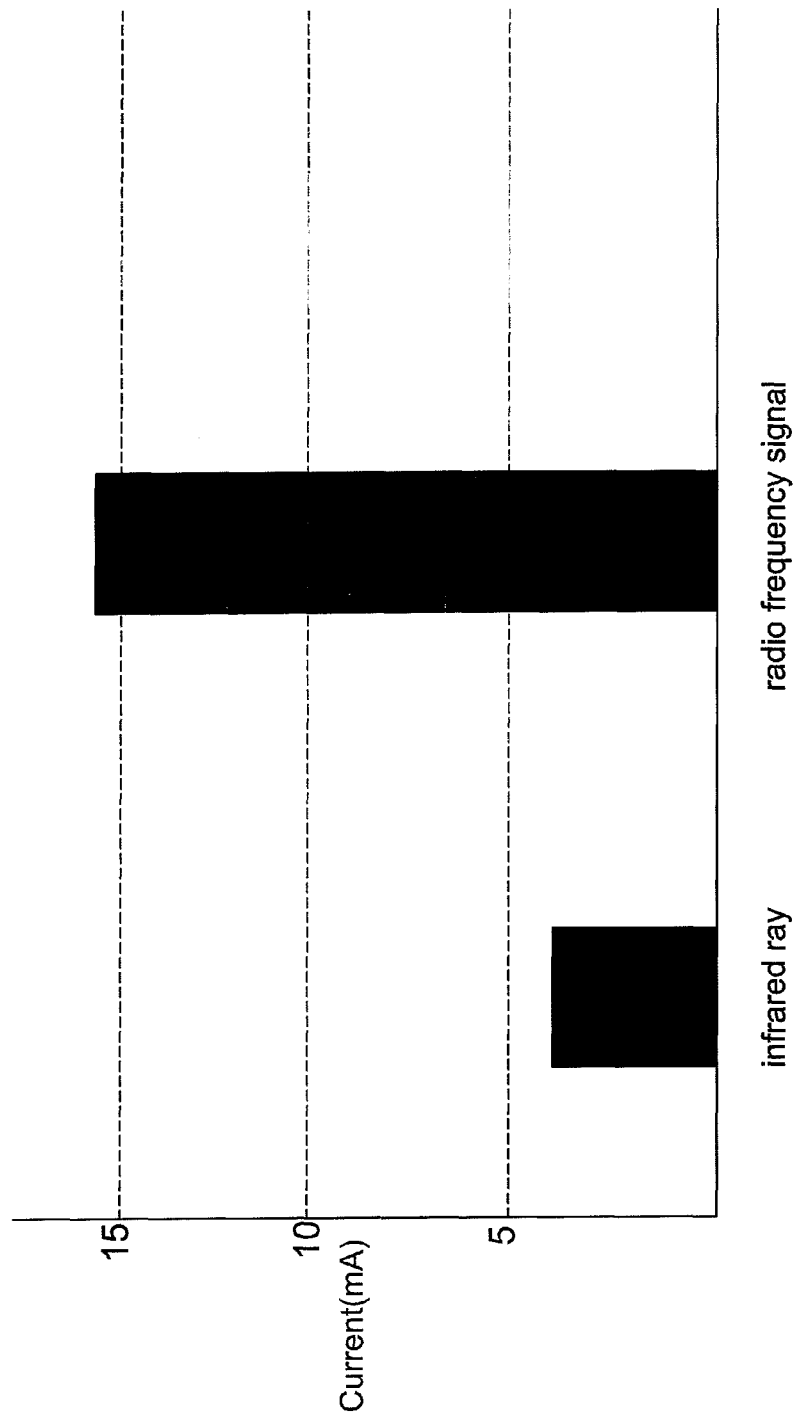
FIG. 3 is a bar graph of current consumption of a wireless sensor network system performing data transmission through infrared ray and radio frequency signal.

Please also refer to FIG. 3; FIG. 3 is a bar graph of current consumption of a wireless sensor network system performing data transmission through infrared ray and radio-frequency signal. In the embodiment, when the node is not in operation status (the node is in the sleep state), the node can determine whether to enter the sleep state or not by receiving infrared data through the light-sensing device. Therefore, the node does not perform data transmission through the radio-frequency signal and decreases power consumption. At this time, required current is 3.46 mA when the node performs data transmission through receiving infrared ray.

When the node is in operation status (the node is in the awake state), the node will change to perform data transmission through the radio-frequency signal, so that the node can provide larger bandwidth to process the huge data stream. At this time, required current is greater than 15 mA when the node performs data transmission through the radio-frequency signal.

Figure 4:
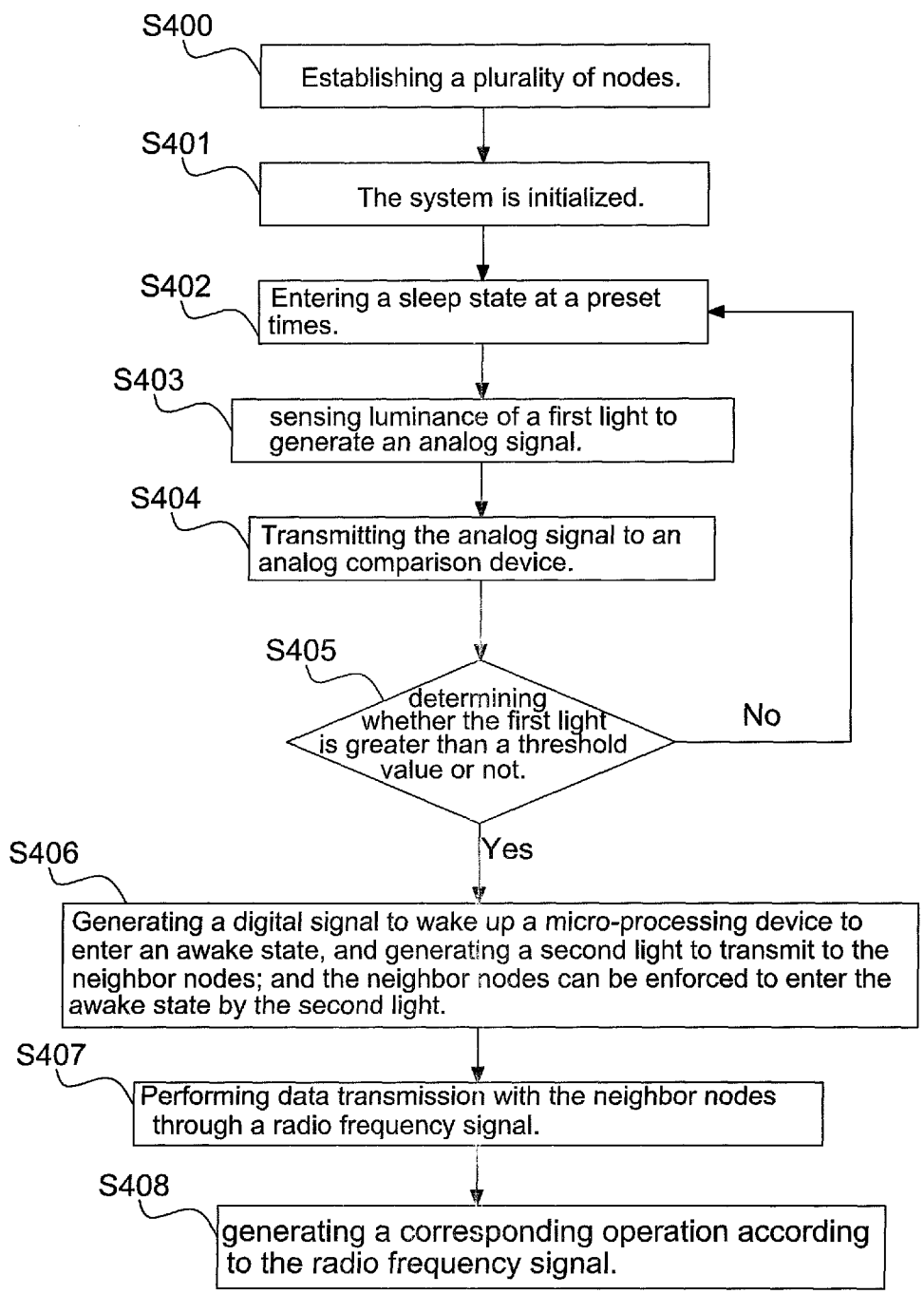
FIG. 4 is a flowchart showing an operation method of a wireless sensor network system according to an embodiment of the invention.

Please refer to FIG. 4. FIG. 4 is a flow chart showing an operation method of a wireless sensor network system according to an embodiment of the invention. The operation method thereof comprises the following steps.

In step S400, establishing a plurality of nodes.

In step S401, the system is initialized.

In step S402, entering a sleep state at a preset times.

In step S403, sensing luminance of a first light to generate an analog signal.

In step S404, transmitting the analog signal to an analog-comparison device.

In step S405, determining whether the first light is greater than a threshold value or not; if yes, go to step S406; if not, go to step S402.

In step S406, generating a digital signal to wake up a micro-processing device to enter an awake state, and generating a second light to transmit to the neighbor nodes; and the neighbor nodes can be enforced to enter the awake state by the second light.

In step S407, performing data transmission with the neighbor nodes through a radio-frequency signal;

In step S408, generating a corresponding operation according to the radio-frequency signal.

In summary, in a wireless sensor network system of the invention, each node can be determined to enter the awake state or not through aforementioned controlling functions according to the light sensed on each node. Therefore, the invention can decrease the power consumption each node must make the transmission device stay awake; instead, the invention does not need to wake up each node through the radio-frequency signal RF, through low-power wake-up mechanism, each node can reduce the power consumption. Moreover, after each node wakes up, it can still perform data transmission or reception by utilizing the radio-frequency signal to process huge data.

What is claimed is:

1. A low-power-consumption wireless sensor network system, comprising:

a plurality of nodes, wherein the nodes can be enforced to enter a sleep state at a preset times and enter an awake state by a first light, and wherein a node comprises:

a light-sensing device, sensing the luminance of the first light to generate an analog signal;

a transmission device, coupled to the light-sensing device to perform data transmission with the nodes through a radio-frequency signal;

an analog-comparison device, comparing the analog signal with a threshold value; and a micro-processing device, generating a corresponding operation according to the analog signal or the radio-frequent signal, wherein after the system is initialized, the micro-processing device and the transmission device are in a sleep state, and wherein if the luminance of the first light exceeds the threshold value set in the analog-comparison device, the analog-comparison device converts the analog signal to a digital signal and wakes up the micro-processing device and the transmission device to perform the corresponding operation.

2. The system according to claim 1, wherein, when the nodes are in the sleep state, the nodes perform data receiving through the first light.

3. The system according to claim 2, wherein, when the nodes are in the awake state, the nodes perform data transmission through the radio-frequency signal.

4. The system according to claim 3, wherein, required current is 3.46 mA when the nodes perform data receiving through the first light; and required current is greater than 15 mA when the nodes perform data receiving through the radio-frequency signal.

5. The system according to claim 3, wherein, after the nodes are in the awake state, the micro-processing device generates a control signal transmitted to a light emitting diode unit through a GPIO interface to make the light-emitting diode unit generating a second light; the neighbor nodes can be enforced to enter the awake state by a second light.

6. An operating method of low-power-consumption wireless sensor network system, the method comprising:

establishing a plurality of nodes, wherein the nodes can be enforced to enter a sleep state at a preset times and enter a awake state by a first light;

sensing the luminance of the first light to generate an analog signal;

transmitting the analog signal;

determining whether the luminance of the first light is greater than a threshold value or not;

performing data transmission with the neighbor nodes through a radio-frequency signal; and generating a corresponding operation according to the radio-frequency signal, wherein if the luminance of the first light exceeds the threshold value, generating a digital signal to wake up a micro-processing device to enter an awake state, and generating a second light to transmit to the neighbor nodes, and wherein the neighbor nodes can be enforced to enter the awake state by the second light.

7. The method according to claim 6, wherein, when the nodes are in the sleep state, the nodes perform data receiving through the first light; when the nodes are in the awake state, the nodes perform data transmission through the radio-frequency signal.

8. The method according to claim 7, wherein, required current is 3.46 mA when the nodes perform data receiving through the first light; and required current is greater than 15 mA when the nodes perform data receiving through the radio-frequency signal.

* * * * *